United States Patent [19]

Faroudja et al.

[11] Patent Number: 4,943,849
[45] Date of Patent: Jul. 24, 1990

[54] TELEVISION TRANSMISSION SYSTEM HAVING IMPROVED SEPARATION OF AUDIO AND VIDEO SPECTRA

[76] Inventors: Yves C. Faroudja, 26595 Anacapa Dr., Los Altos, Calif. 94402; Jack J. Campbell, 1161 De Haro St., San Francisco, Calif. 94110

[21] Appl. No.: 239,298

[22] Filed: Sep. 1, 1988

[51] Int. Cl.$^5$ .............................................. H04N 7/04
[52] U.S. Cl. ...................................... 358/12; 358/141; 358/143
[58] Field of Search .................. 358/12, 143, 144, 141, 358/198

[56]         References Cited
       U.S. PATENT DOCUMENTS 4,553,162  11/1985  Peel .................................... 358/144

*Primary Examiner*—James J. Groody
*Assistant Examiner*—David E. Harvey
*Attorney, Agent, or Firm*—David B. Harrison

[57]                 ABSTRACT

Improved separation of audio and video spectra carried upon spectrally separated audio and video carriers within a television transmission channel leading to a television receiver is realized in a method which includes the transmission steps of: obtaining a high frequency luminance component at the vicinity of the audio carrier offset from the video carrier from a full bandwidth baseband luminance signal received from a video source; limiting the amplitude of luminance energy groups within the high frequency component to be below a predetermined amplitude level; combining the amplitude limited high frequency component into the full bandwidth luminance signal in a manner which provides a composite luminance signal having amplitude limited high frequency energy groups at the vicinity of the audio carrier; adding video synchronizing information to the composite luminance signal to provide a signal video modulation signal; modulating said video carrier with said single video modulation signal; combining the video carrier with the audio carrier into a resultant television composite; and, passing the resultant television composite through the television transmission channel to the television receiver. The method further includes making the audio carrier phase coherent with picture synchronizing information thereby enabling interleave of high frequency video and audio energies. Comb filter separation of video from audio energy groups may then be employed at the receiver.

34 Claims, 13 Drawing Sheets

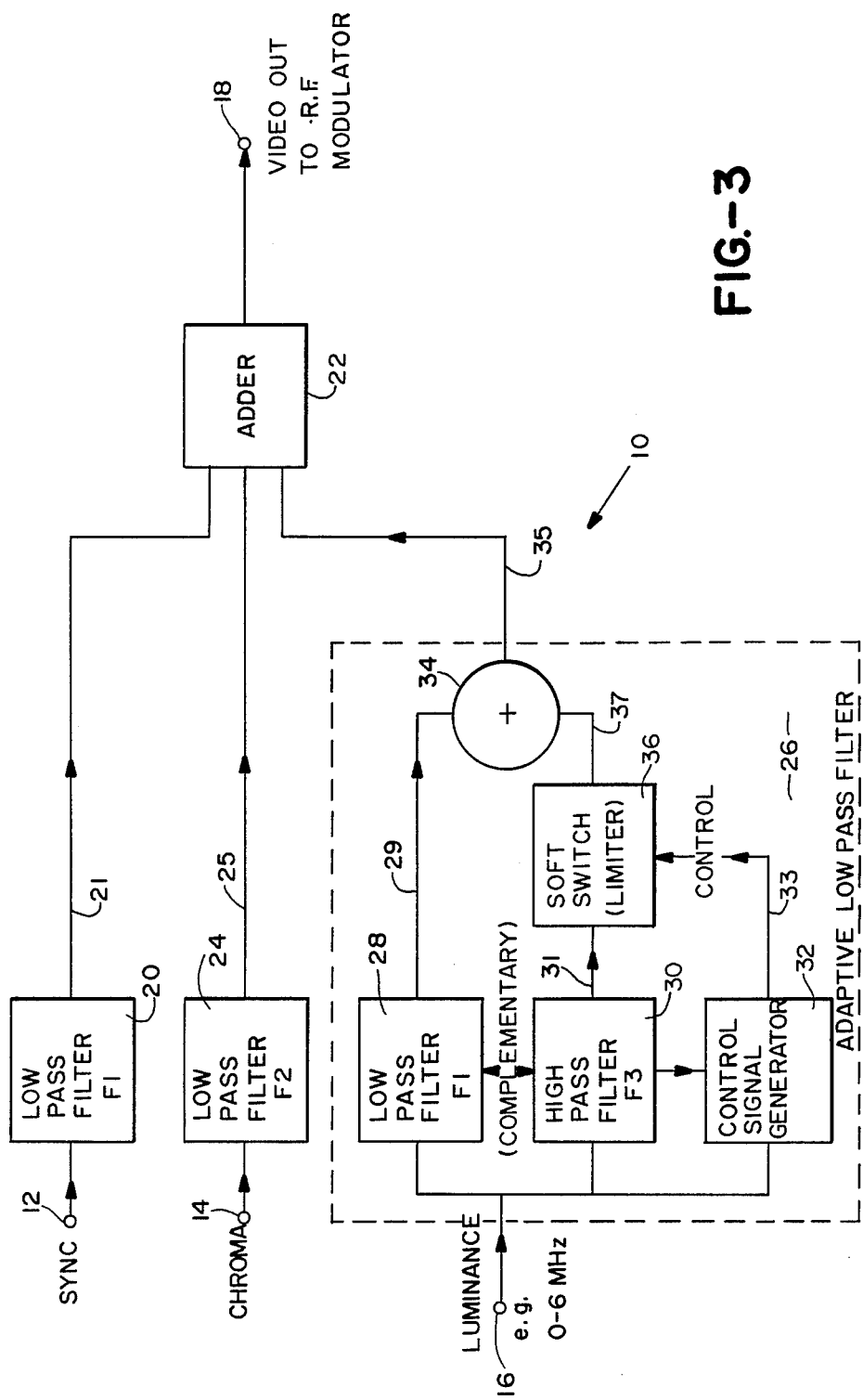

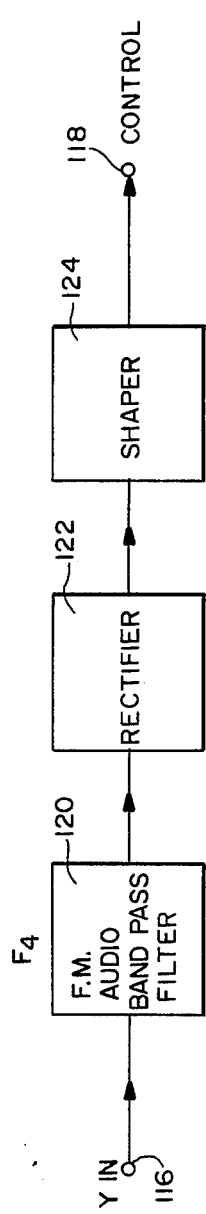
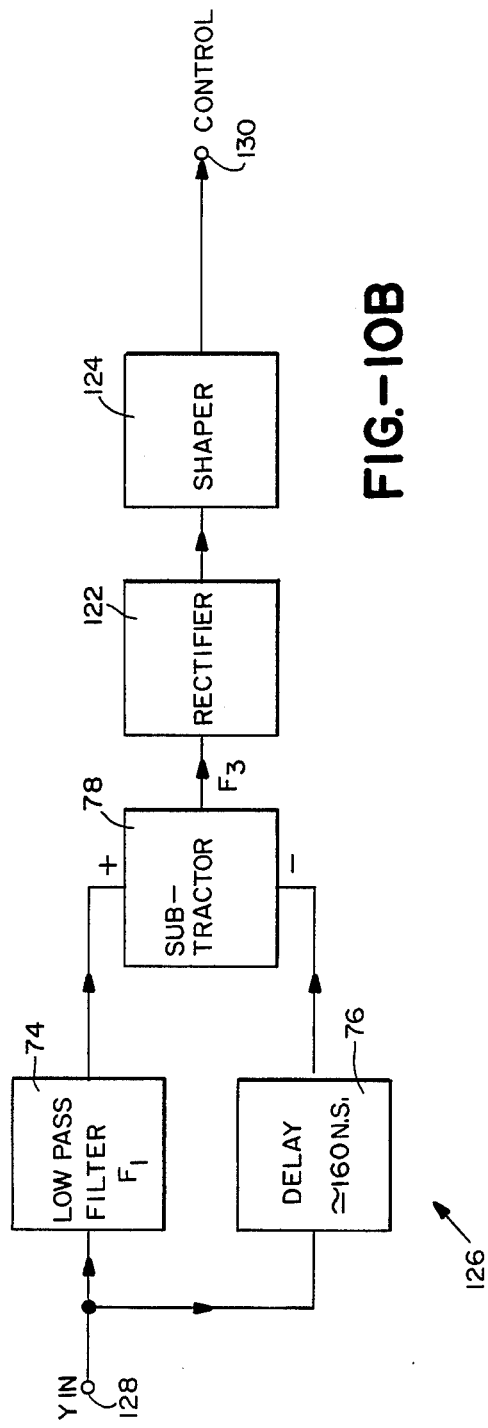

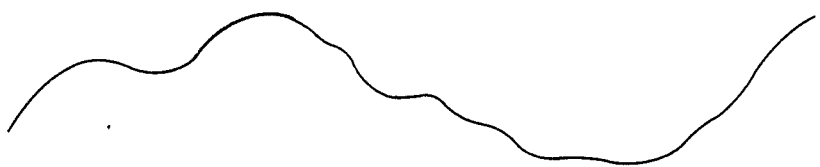
FIG.-12A
FIG.-12B
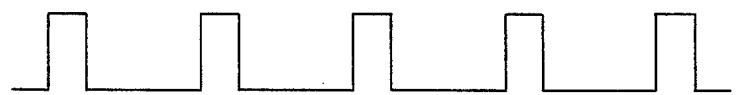
FIG.-12C
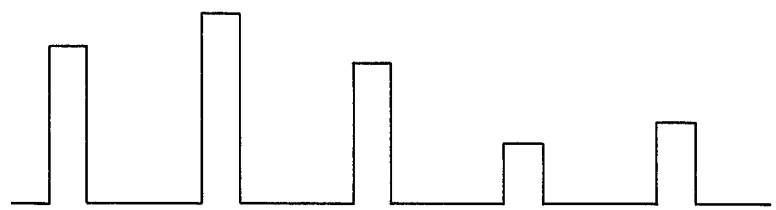
FIG.-12D
FREQUENCY
1 STEP=$F_H$
STEPS AT
$\frac{2N+1}{2} F_H$
VECTORIAL REPRESENTATION
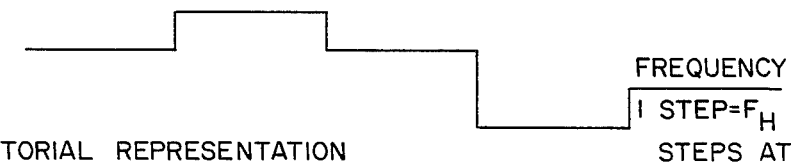
FIG.-12D'  →ＣARRIER
FIG.-12E  HIGH FREQ.S MODULATION
FIG.-12F  RESULTANT MODULATION VECTOR

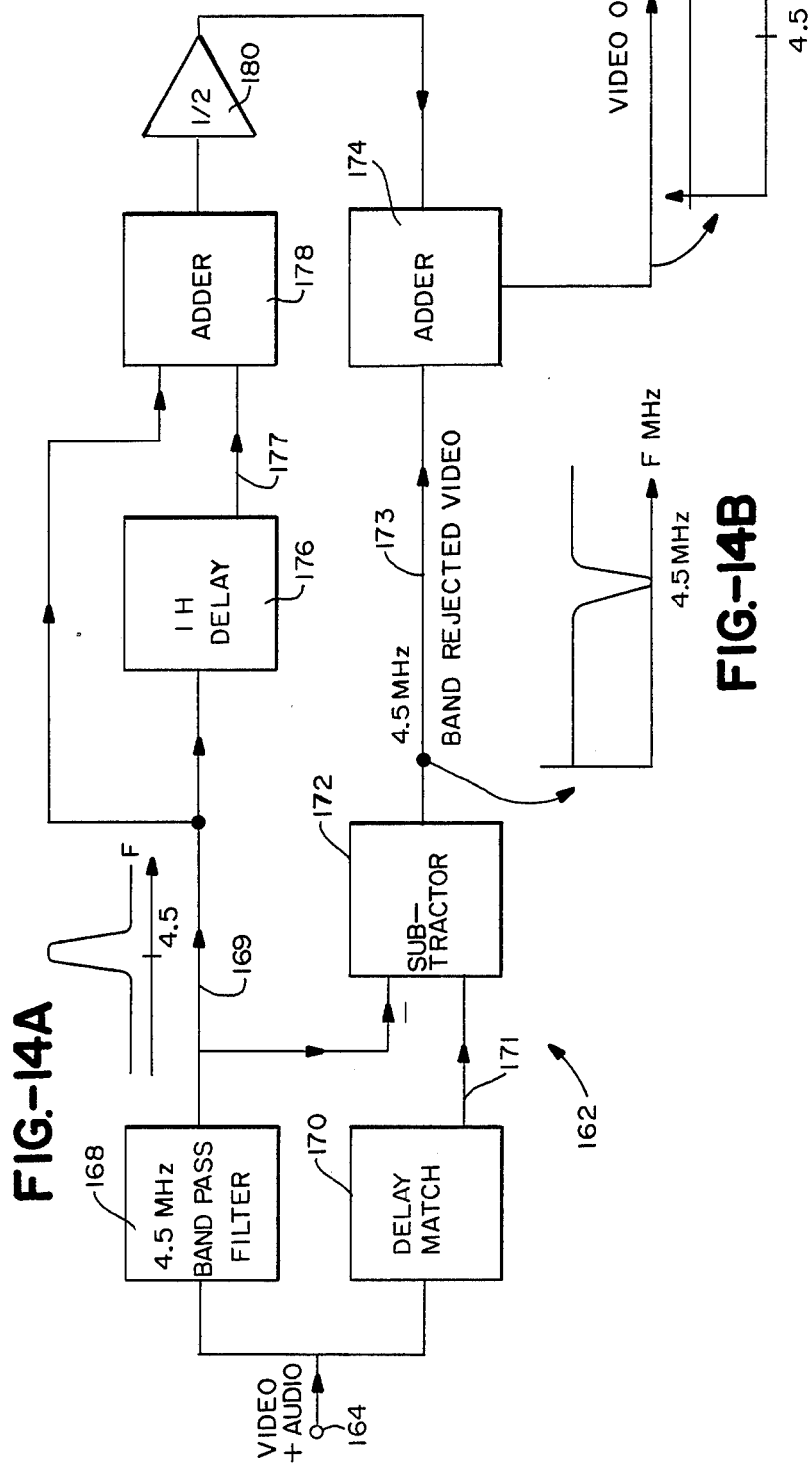

TELEVISION TRANSMISSION SYSTEM HAVING IMPROVED SEPARATION OF AUDIO AND VIDEO SPECTRA

FIELD OF THE INVENTION

The present invention relates to television transmission systems. More particularly, the present invention relates to a television transmission system methods and apparatus for providing improved separation of audio and video spectral components and more efficient use of the limited bandwidth television channel spectrum.

BACKGROUND OF THE INVENTION

In order to promote uniformity of equipment design, each recognized television transmission system has conformed to one of a predetermined few recognized television signal format standards. One such standard for color television is the NTSC standard. In accordance with the NTSC signal standard, for example, the spectrum reserved for each single transmission channel is six Megahertz (6 MHz). This relatively limited spectrum is required to contain the picture carrier including synchronizing information, the color subcarrier and the sound carrier. The separation between the picture carrier and the sound carrier is specified to be only 4.5 MHz, as graphed in FIG. 1.

Since video sidebands extend as high as 4.2 MHz, high frequency video energy groups lie extremely close to the sound carrier, as shown in a graph of the equivalent baseband (FIG. 2). In order to protect the aural information from video signal pollution and interference, it has been common practice to introduce a notch filter into the video path, or into the RF path at the video transmitter end of the conventional television transmission system to eliminate high frequency video energy groups at the nominal location of the sound carrier, i.e. 4.5 MHz in the NTSC system. Typical notch filter designs provide e.g. 20 DB signal reduction to the high frequency picture signal energy groups at the aural carrier center frequency.

Without this notch filter an audible "buzz" will be present and will sometimes be detected and reproduced at the receiver end. This objectionable aural "buzz" is due to interferences created by the video high frequency energy groups. Such energy groups are the result of high speed transitions in the picture content and are also the result of sharp transition edges of synchronizing pulses.

When a notch filter is in place in the video signal transmission path, the objectionable buzz is eliminated. However, the tradeoff is that the notch filter limits video bandwidth and also introduces group delay errors resulting in ringing and chroma transitional artifacts into the transmitted picture spectrum. In any instance, sound or picture will be degraded, and full advantage of the 6 MHz spectrum alloted to the NTSC channel, for example, will not be realized.

Similarly, at the conventional receiver, another notch filter centered at 4.5 MHz is provided in the received video path in order to eliminate visual interference patterns the picture due to the sound carrier. Again, picture quality will be significantly degraded by the receiver video path notch filter.

While adaptive comb filter signal processing at the transmission and reception ends of the television transmission system have dramatically improved the quality of luminance and chrominance component separation, as taught, for example, in the present inventor's U.S. Pat. No. 4,731,660, heretofore the same care has not been taken with the separation of picture and sound signal components at the transmit and receive ends of the television transmission system.

In the NTSC format, the audio signal is transmitted as frequency modulation. One characteristic of such modulation is known as the "capture effect". The capture effect means that the FM discriminator at the receiver "locks onto" the FM signal, providing it manifests a predetermined minimum signal level to achieve "quieting", and eliminates non-coherent information, such as noise and high frequency video energy groups, which is below the quieting level. Thus, for high frequency video energy groups which lie within the spectrum allotted to the sound carrier (4.5 MHz in the NTSC format) but which have amplitudes below the threshold of detection by the FM discriminator at the receiver, there is no technical reason to require removal of such picture energy groups from the transmission path. Yet, the ubiquitous notch filter at both transmitter and receiver does just that.

A hitherto unsolved need has therefore arisen for a television transmission system which makes more effective use of the available limited channel spectrum by passing lower amplitude high frequency picture signal energy groups, while minimizing interference between the picture and sound components of the television signal, and at the same time remaining fully compatible with existing transmission and reception standards and equipment.

SUMMARY OF THE INVENTION WITH OBJECTS

A general object of the present invention is to provide for a more effective sharing of limited channel spectrum for a television broadcast signal which provides increased video signal component bandwidth and minimized interference to and from the audio signal component while remaining compatible with existing television standards and equipment.

A more specific object of the present invention is to provide an adaptive notch filter in the picture signal component path which operates to remove high frequency picture energy groups only as necessary in order to minimize interference between picture and sound signal components of a television transmission system.

Another specific object of the present invention is to measure the baseband picture signal content in order to develop a control signal for adaptively controlling the operational characteristics of a picture carrier notch filter centered about the aural carrier nominal center frequency.

Another specific object of the present invention is to relate phase of the aural subcarrier to phase of the picture signal horizontal synchronizing information in order to enable separation of low frequency aural information and picture information via comb filter techniques.

One more specific object of the present invention is to provide adaptive enhancement processes to television picture signals at both the transmit and receive ends of the transmission system in order to improve overall picture bandwidth and apparent sharpness without interference to or from the aural signal component.

In accordance with the principles of the present invention the new method provides improved separation of audio and video spectra carried upon spectrally separated audio and video carriers within a television transmission channel leading to a television receiver. The method includes the transmission steps of:

obtaining a high frequency luminance component at the vicinity of the audio carrier offset from the video carrier from a full bandwidth baseband luminance signal received from a video source;

limiting the amplitude of luminance energy groups within the high frequency component to be below a predetermined amplitude level;

combining the amplitude limited high frequency component into the full bandwidth luminance signal in a manner which provides a composite luminance signal having amplitude limited high frequency energy groups at the vicinity of the audio carrier;

adding video synchronizing information to the composite luminance signal to provide a single video modulation signal;

modulating said video carrier with said single video modulation signal;

combining the video carrier with the audio carrier into a resultant television composite; and, passing the resultant television composite through the television transmission channel to the television receiver.

The method of the present invention includes the reception steps of:

passing a received and separated video signal through two paths: a main path and an enhancement path;

generating a transition shortened, enhancement video signal from said separated video;

deriving a multiplier control signal in a range from zero to unity from transition amplitudes present in the separated video signal;

multiplying said enhancement video signal by said multiplier control signal to generate a threshold selected enhancement video signal; and adding the main path separated video signal and the threshold selected enhancement video signal together in proper phase relationship to provide an adaptively enhanced separated video signal at said receiver.

The inventive method also may include the further steps of:

receiving baseband audio from a source;

sampling said baseband audio at a rate related to said video synchronizing information to provide an audio sample signal;

controlling with said audio sample signal the frequency stepping operation of a frequency stepping oscillator to generate frequency steps wherein each step is an odd multiple of one half of the video synchronizing information rate; and, generating said audio carrier in accordance with said frequency steps so as to be phase coherent with said video synchronizing information. When this additional aspect of the invention is employed at the transmission end, the method may further comprise at the reception end the steps of:

passing a received and separated video signal having audio energy groups to be separated through two paths: a main path and a bandpass filtered path having a passband centered about the nominal center frequency of the baseband audio carrier;

obtaining a received video band rejected path from said main path and said bandpass filtered path;

comb filter separating said audio energy groups out of the received video signal passing through said bandpass filtered path to provide a comb filtered video signal component; and combining said received video band rejected path and said comb filtered video signal component in proper phase relationship to provide a full band received video signal in which audio energy groups have been removed by comb filter separation.

The disclosed and equivalent apparatus for implementing the above steps is also part of the present invention.

The foregoing and other objects, aspects, advantages and features of the present invention will be more fully understood and appreciated by those skilled in the art upon consideration of the following detailed description of preferred embodiments, presented in conjunction with the accompanying drawings

BRIEF DESCRIPTION OF THE DRAWINGS

In the Drawings:

FIG. 3 is a block diagram of a baseband video signal transmission processor for adaptively limiting the bandwidth of the baseband video signal at the transmit end of a transmission system in accordance with principles and aspects of the present invention.

FIG. 8A is a graph illustrating the operation of the control signal generator element within the FIG. 8 low pass filter structure.

FIGS. 10A and 10B are block diagrams of alternative implementations of the control signal generator element within the FIG. 9 enhancement processor structure.

FIGS. 12A through 12F are a graph of waveforms illustrating operation of circuit elements of the FIG. 11 modulator.

FIGS. 14A, 14B, and 14C are graphs illustrating operational characteristics of the FIG. 14 comb filter structure.

DETAILED DESCRIPTION OF PREFERRED EMBODIMENTS

Figure 1:
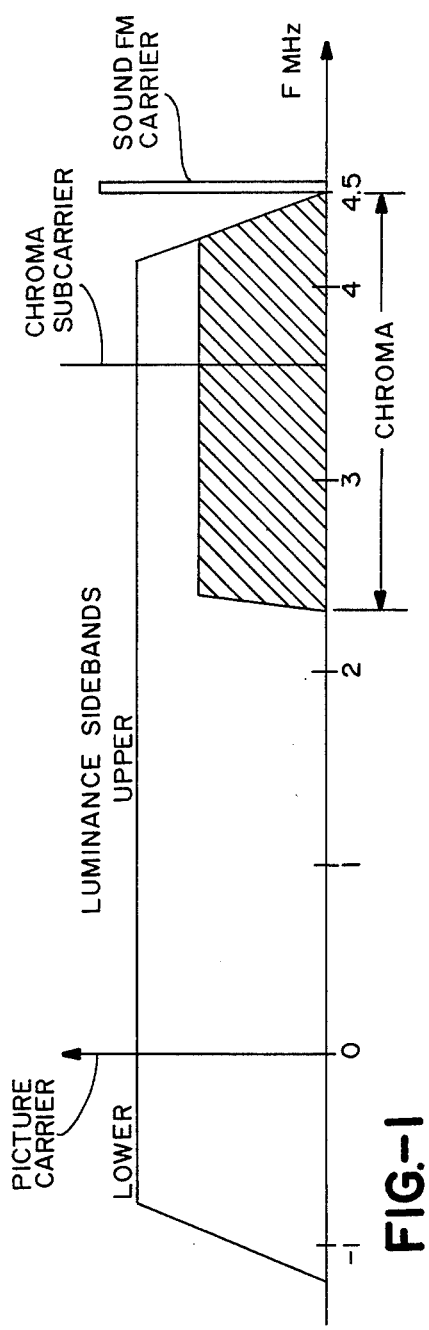
FIG. 1 is a graph of RF spectrum of a typical television transmission channel or band, in accordance with the prior art.
Figure 2:
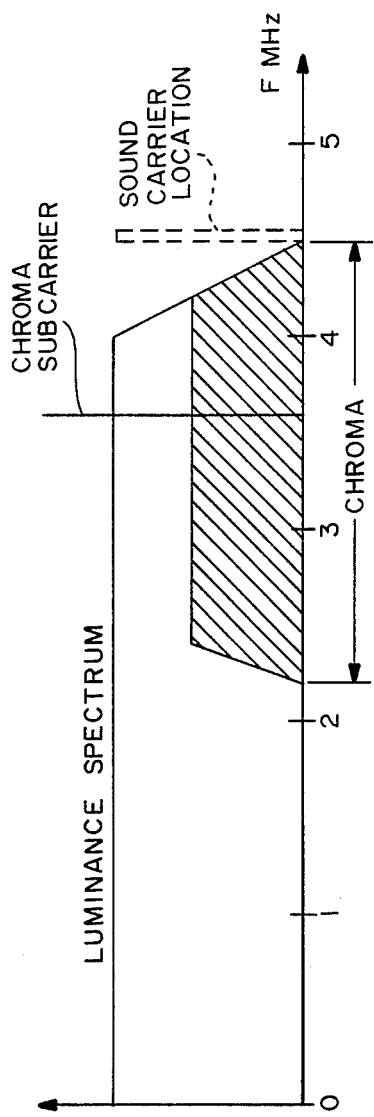
FIG. 2 is a graph of baseband spectrum of the television RF spectrum depicted in FIG. 1.

A baseband color video filtering processor 10 is set forth in FIG. 3. The filtering unit is preferably combined within an encoder of the type generally depicted in FIG. 4 of U.S. Pat. No. 4,731,660, incorporated herein by reference. The processor 10 includes a synchronizing information input 12, a chroma input 14, a luminance input 16 and an output 18.

Figure 4A:
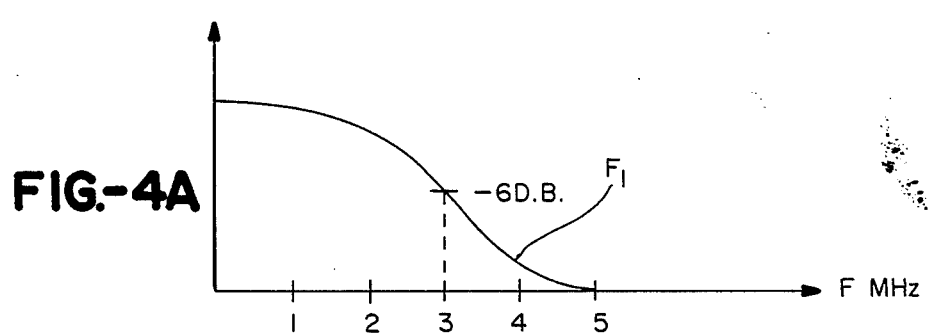
FIGS. 4A, 4B, 4C and 4D set forth frequency response characteristics of filter elements of the FIG. 3 baseband video signal transmission processor and of the FIG. 10A control signal generator.
Figure 4B:
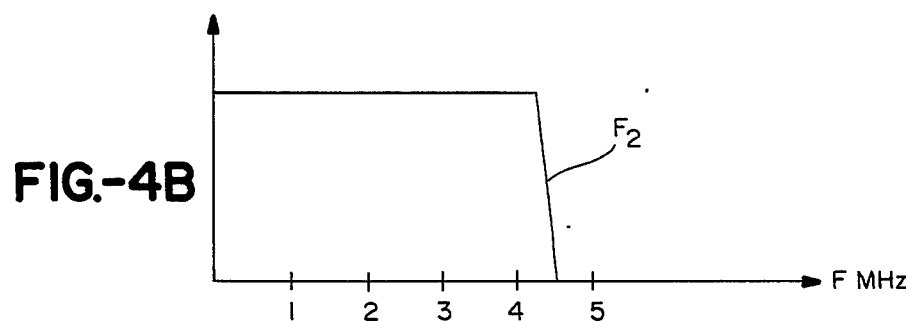

The synchronizing information at the input 12 is passed through a low pass filter 20 and sent via a line 21 to provide one input to an adder circuit 22. The low pass filter 20 has the F1 characteristic which is depicted in FIG. 4A. This filter 20 has a minus 6 DB point at 3 MHz and cuts off at a zero located at 4.5 MHz. The filter 20 has the function of softening the otherwise sharp transition edges of synch pulses so as to eliminate high frequency energy groups thereof lying within the aural carrier spectrum. It has been found in practice that sharp edges are not required on synchronizing pulses in order for these pulses to accomplish their intended function at the receiver end.

Combed chroma information at the input 14 is passed through a low pass filter 24 and sent via a line 25 to a second input of the adder circuit 22. The low pass filter 24 has the characteristic depicted in FIG. 4B as being flat until about 4 MHz and then having a very steep attenuation characteristic to a zero (20 DB down) located at 4.5 MHz. This filter 24 may be implemented by a Matthey Type MCL420B filter which is presently commercially available.

In accordance with principles and aspects of the present invention, combed luminance information at the input 16, having a baseband spectrum of 0-6 MHz, for example, is divided into three paths within an adaptive low-pass filter 26: a first path leading to a low pass filter 28; a second path leading to a high pass filter 30; and, a third path leading to a control signal generator 32.

The first luminance path passes through the low pass filter structure 28 having the characteristics depicted in FIG. 4A and leads via a line 29 to an adder circuit 34. The second luminance path passes through the high pass filter structure 30 having the characteristics depicted in FIG. 4C and leads via a line 31 to a soft switch-limiter 36. As is apparent from a comparison of FIGS. 4A and 4C, the characteristics of the high pass filter structure 30 are complementary with the characteristics of the low pass filter structure 20, i.e. if one were to apply the same signal to both filters 20 and 30 and then to sum the outputs thereof, the signal would not manifest any attenuation with frequency.

The third luminance path is converted into a control signal by operation of the control signal generator 32 (described hereinafter in greater detail in conjunction with FIGS. 10A and 10B). The resultant control signal is put out via a line 33 to control the operation of the soft switch-limiter 36. The switch-limiter 36 operates upon the high frequency luminance energy groups so that they are amplitude-limited to a maximum predetermined amplitude below a level determined to cause interference in the audio signal recovery process at the receiver.

The amplitude-limited energy groups passed by the switch-limiter 36 are sent via a line 37 to the adder 34 wherein they are combined in proper phase relation with the low pass filtered luminance energy groups passed by the filter 28. The resultant luminance signal is put out on a line 35 which leads to a third input of the adder circuit 22.

The adder 22 combines in proper phase relation the low pass filtered synchronizing information on the line 21, the filtered chrominance on the line 25, and the adaptively filtered luminance on the line 35 into a composite video signal which is put out on the output line 18 to the RF modulator of the picture signal transmitter (not shown) of the transmission system.

Figure 5:
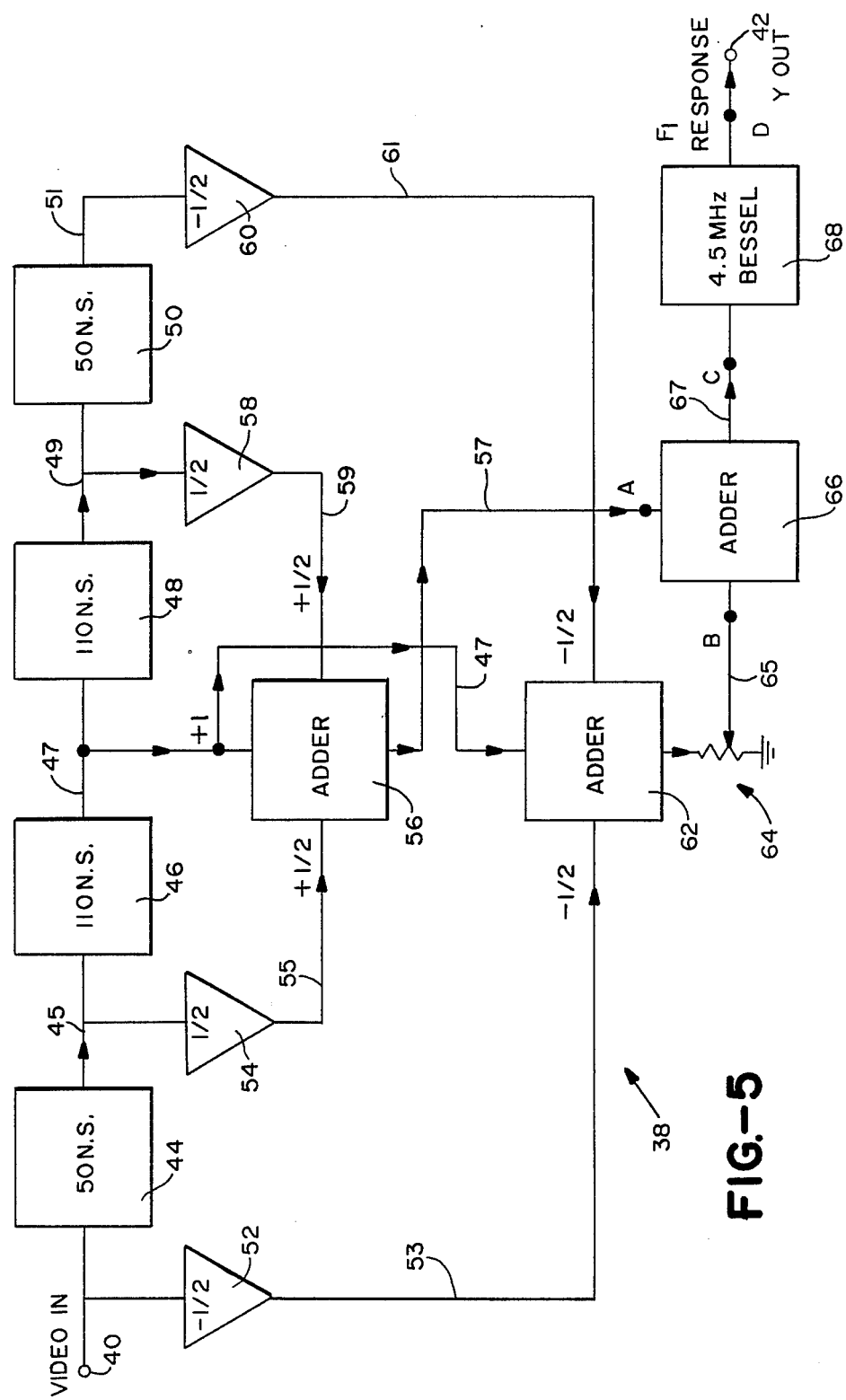
FIG. 5 is a block diagram of a filter structure for implementing the filter of the FIG. 3 processor whose bandpass characteristic is plotted in FIG. 4A.
Figure 6A:
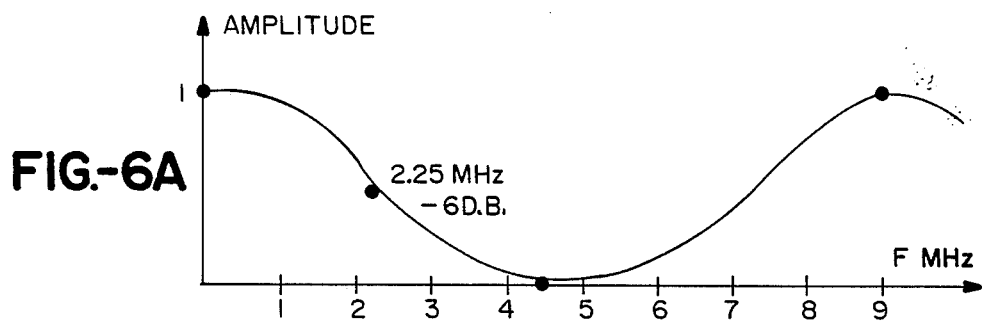
FIGS. 6A through 6D are a series of spectral plots against the same frequency baseline of signal points within the FIG. 5 filter structure.
Figure 6B:
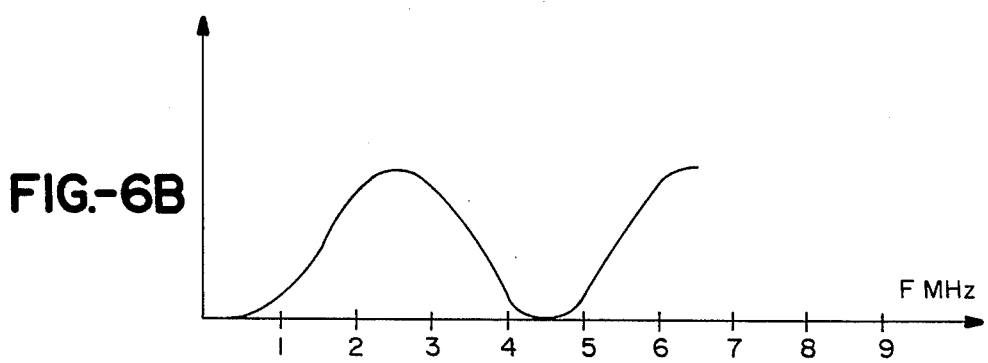
Figure 6C:
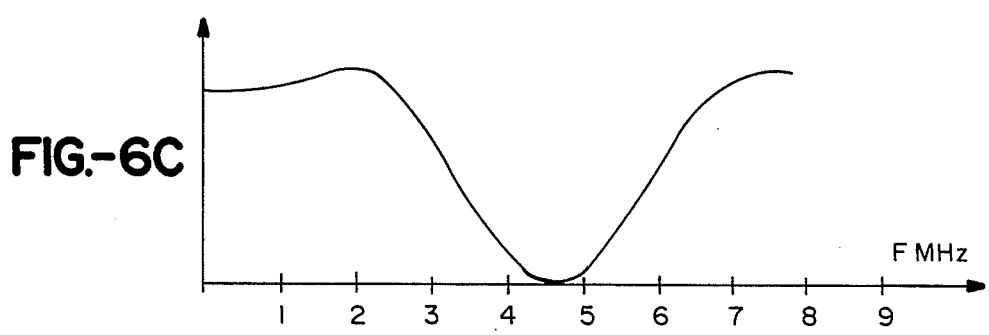
Figure 6D:
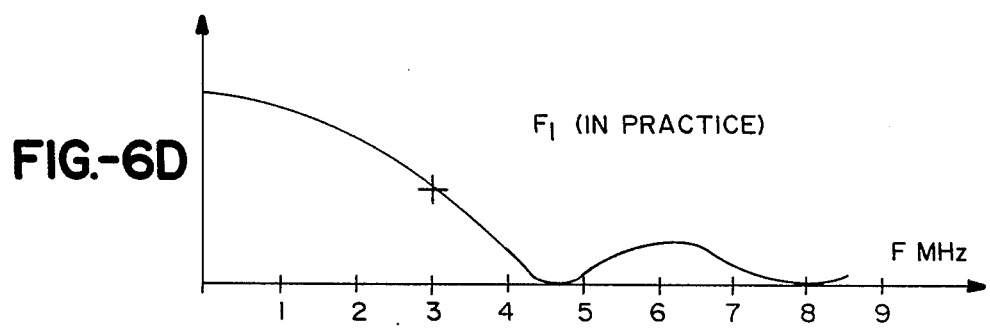

FIG. 5 depicts a structure 38 for implementing the low pass filters 20, 28 of the processor 10 depicted in FIG. 3 and having the FIG. 4A characteristic in an NTSC signal format. The filter 38 includes an input 40 and an output 42. Video received at the input is put through a string of predetermined delays, a first 50 nanosecond delay 44, a first 110 nanosecond delay 46, a second 110 nanosecond delay 48 and a second 50 nanosecond delay 50. Taps 45, 47, and 49, respectively separate the elements 44, 46, 48 and 50; and, an output tap 51 leads from the last delay element 50.

Total delay through the delay line comprising the elements 44, 46, 48 and 50 is 320 nanoseconds, and the 160 nanosecond half length structure of the total delay is configured to provide a zero at approximately 4.5 MHz. The object of design of the filter 38 is to prevent addition of unwanted artifacts such as group delay errors or ringing to video signals flowing through its passband.

Video at the filter input is passed through an amplifier 52 having a minus one-half amplitude gain characteristic, and the resultant signal is put out on a line 53. Video from the tap 45 is passed through a plus one-half amplitude gain amplifier 54, and the resultant signal is put out on a line 55. Video from the tap 47 is connected as one full unit gain input to an adder circuit 56 and as one full unit gain input to another adder circuit 62. Video from the tap 49 is passed through a plus one-half amplitude gain amplifier 58, and the resultant signal is put out on a line 59. Video from the last tap 51 is passed through a minus one-half amplitude gain amplifier 60 and put out on the line 61.

The signals on the lines 55 and 59 are added in the adder circuit 56 along with the signal on the line 47. The resultant sum is put out on a line 57 to a third adder circuit 66; and the signal on the line has the characteristic of Waveform A in FIG. 6. The signals on the lines 53 and 61 are added in the adder circuit 62 along with the signal on the line 47. The output from the adder circuit 62 passes through an adjustable balance resistor 64, whose wiper 65 leads to the adder circuit 66. The signal on the wiper or tap 65 has the characteristic of Waveform B in FIG. 6. The output of the adder circuit 66 is provided on a line 67 leading to a 4.5 MHz Bessel filter 68, the output of which provides the filter output 42. The output on the line 67 has the characteristic of Waveform C in FIG. 6; and, the output on the line 42 has the characteristic of Waveform D thereof, which is approximately minus 6 DB at 3 MHz and minus 20 DB at 4.5 MHz.

Figure 7:
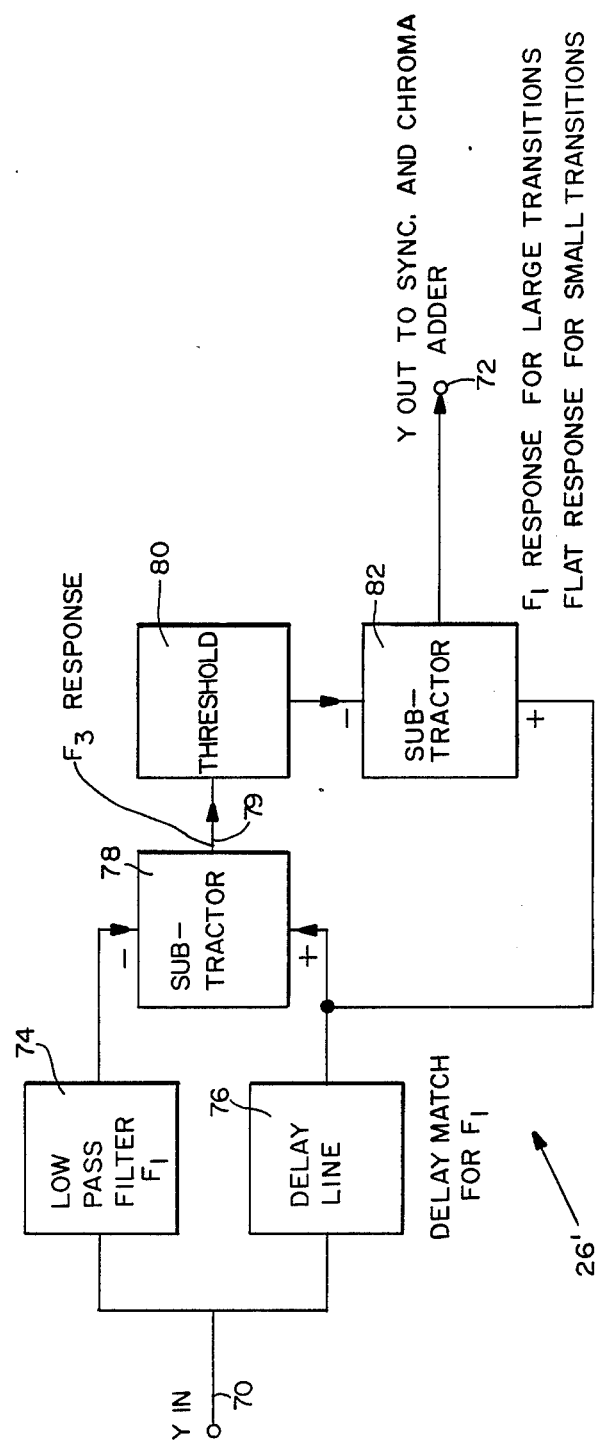
FIG. 7 is an alternative embodiment of an adaptive low pass filter structure of the type included within the FIG. 3 baseband video signal processor.

An alternative adaptive low pass filter 26' is depicted in FIG. 7 as having a luminance input 72 and an adaptively filtered luminance output 74. The luminance input 70 is split into two paths: a first path leading through a low pass filter 74 having the characteristic depicted in FIG. 4A and implemented, for example, as the structure 38 depicted in FIGS. 5 and 6 and discussed above in connection therewith; and, a second or main path leading through a delay line 76 having a delay selected to match the delay through the circuit 74 (e.g. nominally 160 nanoseconds).

Figure 4C:
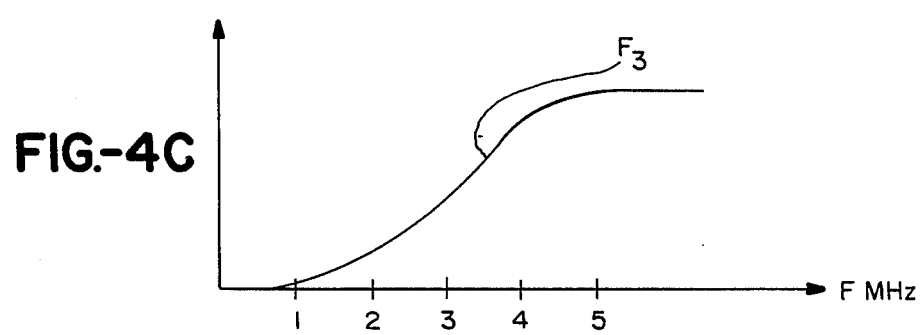
Figure 4D:
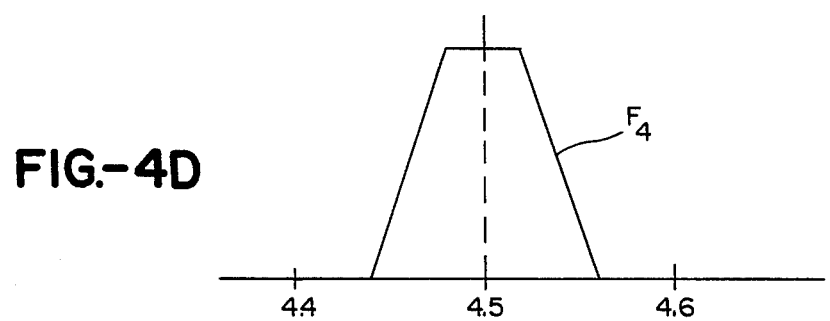

The low-pass-filtered component put out by the filter 74 is subtracted from the phase matched, delayed unfiltered baseband luminance component put out by the delay match 76 in a subtractor circuit 78 in order to achieve a high pass filter structure of the type whose output characteristic is depicted as FIG. 4C and which is the pass band complement of the filter characteristic depicted as FIG. 4A. (Thus, the elements 76 and 78 may be combined with the element 28 in accordance with FIG. 7 in order to achieve the high pass filter 30 depicted in FIG. 3.)

An output 79 from the subtractor 78 is passed through a threshold circuit 80 which passes luminance high frequency energy groups above a predetermined threshold, e.g. 40 to 60 IRE units. These energy groups are then subtracted from the luminance full baseband signal put out from the delay match 76 by operation of a second subtractor circuit 82. The output 72 of the second subtractor 82 is thus a luminance signal in which high amplitude, high frequency luminance energy groups have been eliminated in order to prevent interference with the sound channel spectrum.

This implementation 26' of the adaptive low pass filter structure eliminates the need for a control circuit and accomplishes adaptive low pass filtering of luminance by operation of the threshold circuit 80. Thus, when the high frequency luminance energy groups are below the threshold, they pass through the subtractor 82 unaffected. When they are above the threshold, they are subtracted proportionally, so that the energy groups put out by the subtractor 82 are of amplitudes below the threshold level, irrespective of incoming amplitude.

Figure 8:
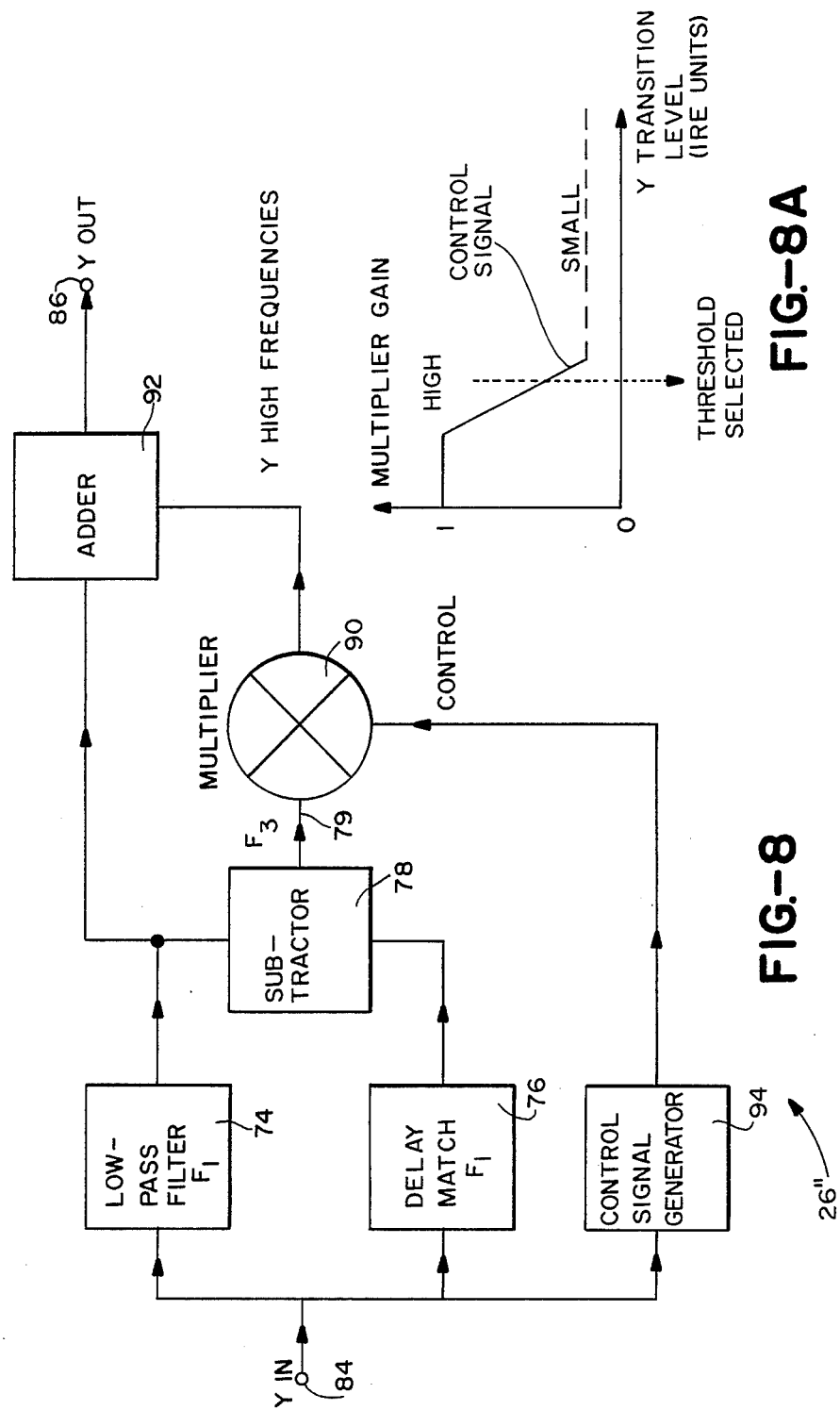
FIG. 8 is another alternative embodiment of an adaptive low pass filter structure of the type included within the FIG. 3 baseband video signal processor.

Yet another preferred implementation 26" of the adaptive low pass filter 26 depicted in FIG. 3 is found in FIG. 8. In this structure 26" a luminance input 84 leads to an adaptively filtered luminance output 86 via the FIG. 4C high pass filter structure realized with the elements 74, 76 and 78 as discussed in conjunction with FIG. 7; and, via a multiplier 90 and adder 92. A control circuit 94 generates a multiplier control signal, having a characteristic as graphed in FIG. 8A. Thus, the gain characteristic of the multiplier 90 is seen to be a function of IRE transition level and the control slope and consequent gain characteristic is easily controlled by the designer.

Figures 9, 9A:
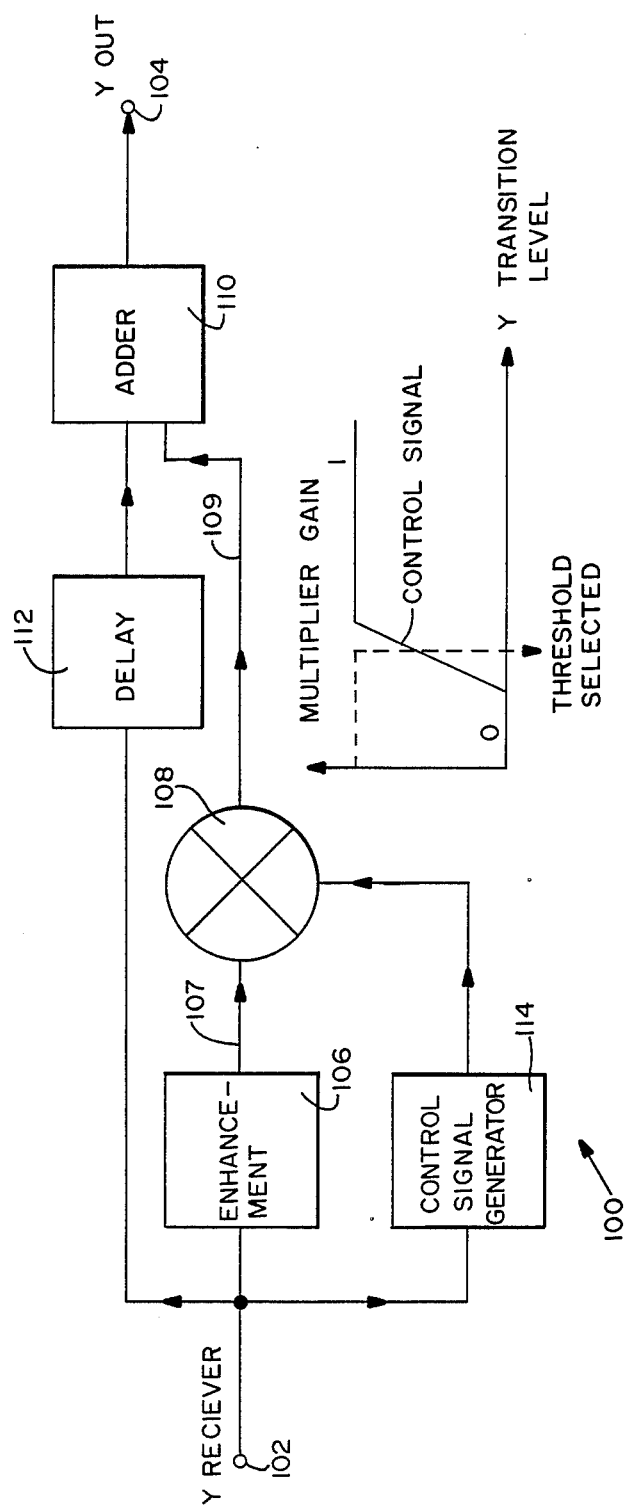
FIG. 9 is a block diagram of a video signal component enhancement processor within a television receiver which incorporates principles and aspects of the present invention.
FIG. 9A is a graph illustrating operation of the FIG. video signal enhancement processor within the receiver.

A television receiver enhancement processor 100 is depicted in FIG. 9. It has a luminance input 102 which comes from luminance/chrominance separation circuitry within the receiver; and, it has an output 104 leading to the luminance video amplifier stage of the receiver. One path of incoming luminance leads through an enhancement process, such as the video recrispening process described in the inventor's U.S. Pat. No. 4,030,121 for Video Crispener, the disclosure of which is incorporated herein by reference. Essentially, the processes described therein shorten luminance (and chroma) transition times and thereby add sharpness or crispness to the resultant picture image. The crispened video path exits the enhancement process 106 on a line 107 which leads to a multiplier 108 and thence, on a line 109, to one input of an adder circuit 110.

Another path for the incoming luminance on the line 102 leads through a delay matching circuit 112 which matches the delays inherent in the processes 106 and 108 to another input of the adder circuit 110. The delay matched main path video (which has had high amplitude, high frequency luminance energy groups attenuated adaptively at the transmitter end of the system) is combined with an adaptively determined enhancement component put out by the multiplier 108.

A third path for the incoming luminance is to a control signal generator 114. The control signal generator 114 generates a multiplier control signal as graphed in FIG. 9A which controls the gain characteristic (between zero and unity) of the multiplier 108. The graph of 9A is generally the complement of the control signal graphed in FIG. 8A. Thus, when high frequency luminance energy groups approach the cutoff threshold imposed at the transmit end, these groups (as enhanced by crispening for example by the enhancement processor 106) are added in full measure to the properly delayed, baseband luminance in the adder circuit 110. When properly adjusted, the overall process of FIG. 3 through FIG. 9 provides a very flat luminance frequency response to 4.5 MHz and with no interference with the audio carrier and with none of the artifacts and bandwidth limitations resulting from the trap filters of the prior art.

Several control circuits for generating multiplier control signals are depicted in FIGS. 10A and 10B. A first such circuit 114 is depicted in FIG. 10 A and it includes a luminance input line 116 and a multiplier control output line 118. The input 116 leads through a very narrow pass band FM audio bandpass filter 120 having a bandpass characteristic as graphed in FIG. 4D. The resultant signal, comprising high frequency luminance energy groups lying within the FM audio passband, is full wave rectified in a full wave rectifier circuit 122 in order to remove the sense of each transition and to provide an absolute value. Then, the absolute value signal is shaped in a wave shape circuit 124 to have the desired multipler control signal waveshape, e.g. FIG. 8A, and put out on the line 118 to control the multiplier gain characteristic between zero and unity.

Another control circuit 126 having a broader passband and providing a more robust multiplier gain control signal is depicted in FIG. 10B. Therein, the FIG. 4C high pass filter structure comprising the elements 74, 76 and 78, discussed previously, is connected to an input 128. The output from the high pass filter structure leads through the rectifier 122 and shaper 124 to a multiplier gain characteristic control line 130. One advantage of the control circuit 126 over the circuit 114 is that cross color artifacts are also removed.

With the foregoing approach, audio energy remains in overlap arrangement with the high frequency energy groups, thereby necessitating a threshold which essentially reduces high amplitude, high frequency luminance transitions, to a level below the detection threshold of the FM audio discriminator circuit of the receiver audio path. Also, the problem remains that sound carrier energies within the FM passband overlie the video information therein, leading to pollution of a wideband video signal by the audio information. These drawbacks are overcome, and further improvements in adaptivity are realized when the audio signal is made to be phase coherent with the horizontal synchronizing information of the picture signal.

Figure 11:
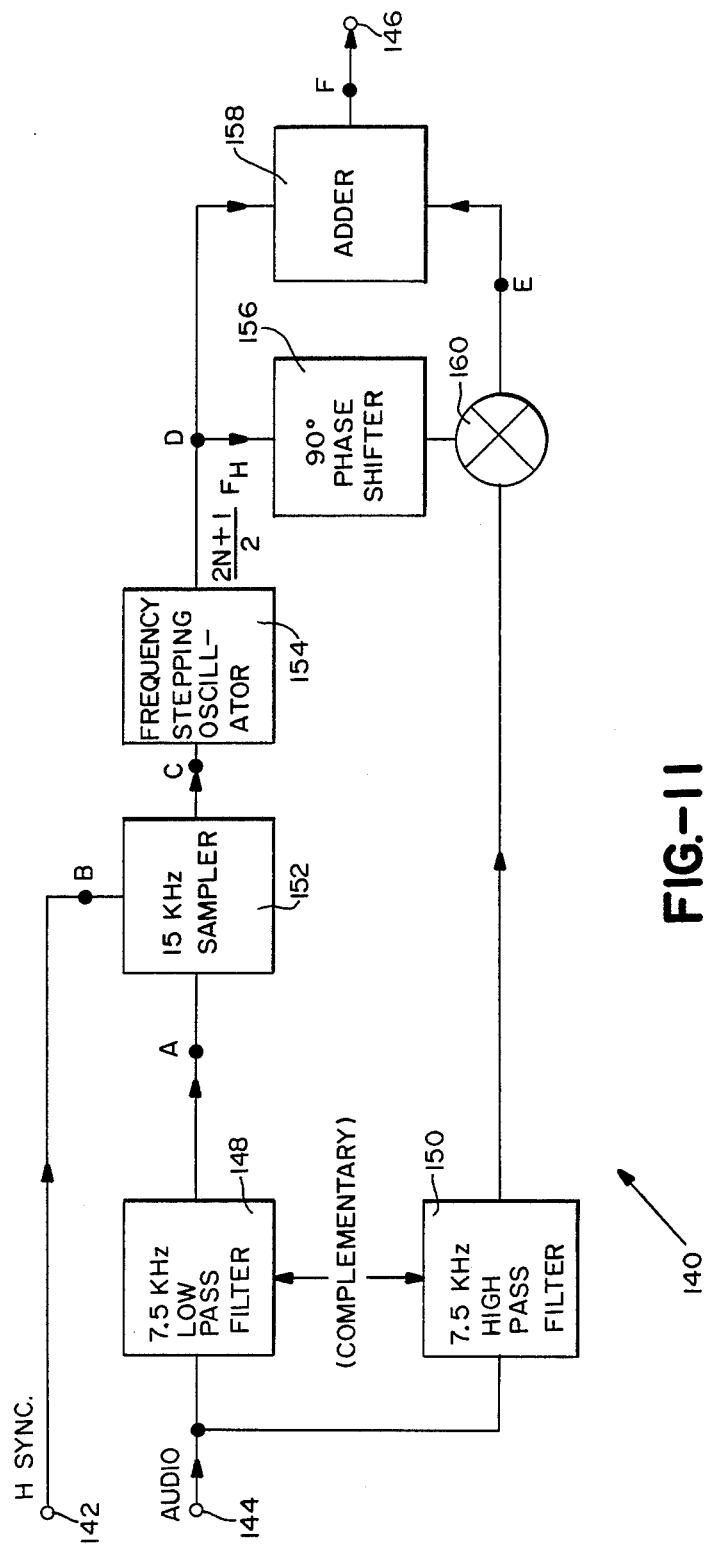
FIG. 11 is a block diagram of an audio FM modulator which is phase locked to the picture horizontal synchronizing information at the transmission end of the transmission system in accordance with principles and aspects of the present invention.

FIG. 11 depicts an audio frequency shift modulator circuit 140 which is phase locked to the horizontal scan frequency and is such that the FM modulation always follows the function:

$$\frac{2N+1}{2} F_H,$$

where $F_H$ equals the horizontal line scan frequency and where n equals a number which varies in accordance with the FM modulation. The depicted modulator is actually a frequency shift modulator rather than a true analog frequency modulation modulator. Thus, in accordance with the audio signal being sampled at the horizontal line scan rate, the FM carrier shifts between values which are odd multiples of one half of the horizontal line scan rate.

The circuit 140 includes a horizontal sync input 142, an audio input 144 and an FM modulation component output 146. Since the horizontal line scan rate in the NTSC system is nominally 15,734 Hertz, the Nyquist sampling limitation is one half the scan rate, or 7,867 Hz. Otherwise, undesirable audio aliases will be produced. Thus, two complementary filters 148 and 150 having crossover points at approximately 7500 Hz effectively separate the audio spectrum into two segments, a low frequency segment passed by the filter 148, and a high frequency segment passed by the filter 150.

The low frequency audio segment, having a characteristic graphed as Waveform A in FIG. 12, is applied as an input to a sampler circuit 152 wherein amplitude samples are taken at the line scan rate, graphed as Waveform B in FIG. 12. The resultant samples, graphed as Waveform C in FIG. 12, are applied to control a frequency stepping oscillator 154 which steps between frequencies which are odd multiples of one half of the line scan rate at a rate directly proportional to the sample amplitudes as graphed at Waveform C, FIG. 12.

Figure 13:
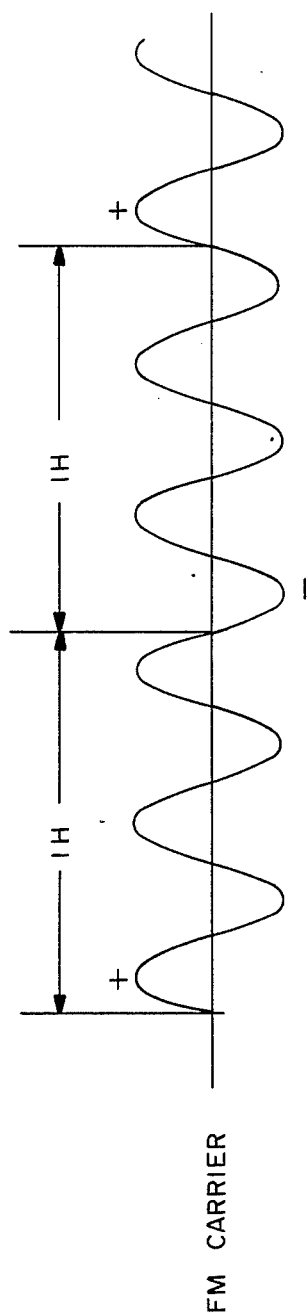
FIG. 13 is a graph illustrating phase relationship between the sound FM Carrier and the picture horizontal synchronizing information resulting from operation of the FIG. 11 audio FM modulator circuit.

The resultant modulation, Waveform D of FIG. 12, is applied to a 90 degree phase shift circuit 156 and to an adder circuit 158. The audio high frequency segment put out by the filter 150 is applied as one input to an AM suppressed carrier modulator 160, the other input being provided by the output from the 90 degree phase shift modulator. The resultant quadrature modulation of the audio high frequencies, Waveform E of FIG. 12, is then added with the baseband modulation, Waveform D of FIG. 12, in the adder circuit 158, in order to produce a resultant modulation vector graphed as Waveform F of FIG. 12. FIG. 13 illustrates somewhat diagrammatically the relationship between the audio FM carrier and the horizontal sync frequency.

A simple comb filter structure 162 in the luminance path at the television receiver eliminates the phase locked audio signal from the luminance. The structure includes an input 164 for receiving video and audio, and an output 166 for putting out full bandwidth luminance in which the audio has been removed by comb filter separation techniques.

As AM modulation of a carrier in phase quadrature with the carrier itself is equivalent to phase or frequency modulation, a conventional audio FM demodulator circuit within an ordinary television receiver will recover the quadrature modulated audio high frequencies by usual means. It is also possible to use an extra subcarrier to carry vastly improved audio high frequencies and demodulate them in a non-standard way in a specially adapted receiver.

Incoming video (including the interleaved audio FM energy groups) is separated into two paths, a first path through a 4.5 MHz band pass filter 168 having the characteristic graphed in FIG. 14A; and, a second path through a delay match circuit 170 having a delay to match the delay of the filter 168. An output line 169 from the filter 168 is subtracted from the delay matched video signal put out from the delay match 170 on a line 171 by operation of a subtractor circuit 172. The resultant signal on a line 173 includes all of the baseband video spectrum, except the portion thereof notched out by the bandpass filter 168, as graphed in FIG. 14B.

The notch filtered video at the baseband audio carrier frequency (4.5 MHz) on the line 169 enters a simple 1 H comb filter structure comprising a 1 H delay line 176 having an output line 177 and an adder circuit 178. Undelayed notch filtered video on the line 169 and 1 H delayed notch filtered video on the line 177 are added together in the adder circuit 178 so that the interleaved audio frequency energy groups (modulated at odd multiples of one half the line scan rate) are phase cancelled from line to line. The resultant signal, being video from which audio has been cancelled by comb filtering, is passed through a one half unity gain amplifier 180 and then combined with the band rejected video signal in an adder circuit 174. The signal put out by the adder circuit 174 is full bandwidth video in which the audio component has been removed by comb filter separation, as shown in FIG. 14C.

While the methods and apparatus of the present invention have been summarized and explained by an illustrative application in a television transmission system having improved separation of audio and video signal components, it will be readily apparent to those skilled in the art that many widely varying embodiments and applications are within the teaching and scope of the present invention, and that the examples presented herein are by way of illustration only and should not be construed as limiting the scope of this invention.

I claim:

1. A method for providing improved separation of audio and video spectra carried upon spectrally separated audio and video carriers within a television transmission channel leading to a television receiver, said method comprising the transmission steps of:
   a. obtaining a high frequency luminance component at the vicinity of the audio carrier offset from the video carrier from a full bandwidth baseband luminance signal received from a video source;
   b. limiting the amplitude of luminance energy groups within the high frequency component to be below a predetermined amplitude level;
   c. combining the amplitude limited high frequency component into the full bandwidth luminance signal in a manner which provides a composite luminance signal having amplitude limited high frequency energy groups at the vicinity of the audio carrier;
   d. adding video synchronizing information to the composite luminance signal to provide a single video modulation signal;

e. modulating said video carrier with said single video modulation signal;

f. combining said video carrier with said audio carrier into a resultant television composite; and, g. passing the resultant television composite through said television transmission channel to the television receiver.

2. The method set forth in claim 1 wherein said step of obtaining the high frequency component at the vicinity of the audio carrier comprises the steps of passing the full bandwidth luminance signal through a high pass filter.

3. The method set forth in claim 1 comprising the further step of low pass filtering the synchronizing information prior to its being added to the composite luminance signal.

4. The method set forth in claim 1 comprising the further steps of:

low pass filtering a chrominance component received from said video source and adding said low pass filtered chrominance component to said synchronizing information and to the composite luminance signal in order to provide said single video modulation signal.

5. The method set forth in claim 1 wherein the step of limiting the amplitude of luminance energy groups within the high pass filtered component comprises the steps of:

developing a control signal from said full bandwidth luminance signal which is related to the absolute value of amplitudes of signal transitions therein; and, applying the control signal to control operation of a soft switch-limiter for limiting the amplitude of luminance energy groups within the high pass filtered component to be below a predetermined amplitude level.

6. The method set forth in claim 1 wherein the step of combining the amplitude limited high frequency component into the full bandwidth luminance signal in a manner which provides a composite luminance signal having amplitude limited high frequency energy groups at the vicinity of the audio carrier comprises the steps of separating the full bandwidth luminance signal into a low pass filtered component and subtracting said low pass filtered component from said full bandwidth luminance signal to provide said high pass filtered component; passing said high pass filtered component through a threshold circuit which passes energy groups above a predetermined threshold; and, subtracting the resultant threshold processed signal from said full bandwidth luminance signal to provide the composite luminance signal.

7. The method set forth in claim 1 wherein the step of combining the amplitude limited high frequency component into the full bandwidth luminance signal in a manner which provides a composite luminance signal having amplitude limited high frequency energy groups at the vicinity of the audio carrier comprises the steps of:

low pass filtering the full bandwidth luminance signal to provide a low pass filtered component, subtracting the low pass filtered component from the full bandwidth luminance signal to provide a high pass filtered component, deriving a multiplier control signal in a range from zero to unity from transition amplitudes present in the the full bandwidth luminance signal, multiplying the high pass filtered component by the multiplier control signal to provide a product, and adding said product to said lowpass filtered component to provide said composite luminance signal.

8. The method set forth in claim 7 wherein said step of deriving said multiplier control signal comprises the steps of:

band pass filtering the full bandwidth luminance signal in a passband centered about the nominal audio carrier to provide a filtered raw control signal, removing the sign from the raw control signal, and shaping the raw control signal into said multiplier control signal.

9. The method set forth in claim 7 wherein said step of deriving the multiplier control signal comprises the steps of removing the sign from said high frequency component to provide a raw control signal and shaping the raw control signal into said multiplier control signal.

10. The method set forth in claim 1 further comprising the reception steps of:

passing a received and separated video signal through two paths: a main path and an enhancement path;

generating a transition shortened, enhancement video signal from said separated video;

deriving a multiplier control signal in a range from zero to unity from transition amplitudes present in the separated video signal;

multiplying said enhancement video signal by said multiplier control signal to generate a threshold selected enhancement video signal; and adding the main path separated video signal and the threshold selected enhancement video signal together in proper phase relationship to provide an adaptively enhanced separated video signal at said receiver.

11. The method set forth in claim 10 wherein said separated video signal comprises luminance.

12. The method set forth in claim 1 further comprising the steps of:

receiving baseband audio from a source;

sampling said baseband audio at a rate related to said video synchronizing information to provide an audio sample signal;

controlling with said audio sample signal the frequency stepping operation of a frequency stepping oscillator to generate frequency steps wherein each step is an odd multiple of one half of the video synchronizing information rate; and, generating said audio carrier in accordance with said frequency steps so as to be phase coherent with said video synchronizing information.

13. The method set forth in claim 12 comprising the further reception step of recovering said audio carrier in a television receiver.

14. The method set forth in claim 12 wherein said video synchronizing information comprises horizontal line scan synchronizing pulses.

15. The method set forth in claim 14 wherein the step of receiving baseband audio from a source includes the steps of separating the baseband audio into two components: a low frequency component of energies lying below a frequency which is one half of the horizontal line scan rate, and a high frequency component of energies lying mostly above a frequency which is one half of the horizontal line scan rate, and comprising the further steps of:

double sideband suppressed carrier modulating the high frequency component of energies in quadrature relation with said audio subcarrier; and combining the quadrature modulated audio subcarrier and the frequency steps modulated audio carrier to provide a composite audio carrier.

16. The method set forth in claim 14 further comprising the reception steps of:

passing a received and separated video signal having audio energy groups to be separated through two paths: a main path and a bandpass filtered path having a passband centered about the nominal center frequency of the baseband audio carrier;

obtaining a received video band rejected path from said main path and said bandpass filtered path;

comb filter separating said audio energy groups out of the received video signal passing through said bandpass filtered path to provide a comb filtered video signal component; and combining said received video band rejected path and said comb filtered video signal component in proper phase relationship to provide a full band received video signal in which audio energy groups have been removed by comb filter separation.

17. Apparatus for providing improved separation of audio and video spectra carried upon spectrally separated audio and video carriers within a television transmission channel leading to a television receiver, said apparatus comprising:

a. input means for obtaining a high frequency luminance component at the vicinity of the audio carrier offset from the video carrier from a full bandwidth baseband luminance signal received from a video source;

b. limiting means for limiting the amplitude of luminance energy groups within the high frequency component to be below a predetermined amplitude level;

c. first combining means for combining the amplitude limited high frequency component into the full bandwidth luminance signal in a manner which provides a composite luminance signal having amplitude limited high frequency energy groups at the vicinity of the audio carrier;

c. second combining means for combining video synchronizing information and the composite luminance signal to provide a single video modulation signal;

d. video modulating means for modulating said video carrier with said single video modulation signal;

e. third combining means for combining said video carrier with said audio carrier into a resultant television composite; and, f. transmission means for transmitting the resultant television composite through said television transmission channel to the television receiver.

18. The apparatus set forth in claim 17 wherein said input means includes a high pass filter.

19. The apparatus set forth in claim 17 further comprising low pass filter means connected to said second combining means for low pass filtering the synchronizing information prior to its being added to the composite luminance signal.

20. The apparatus set forth in claim 17 wherein said input means includes low pass filter means for low pass filtering a chrominance component received from said video source and said second combining means is connected to said low pass filter means for adding said low pass filtered chrominance component to said synchronizing information and to the composite luminance signal in order to provide said single video modulation signal.

21. The apparatus set forth in claim 17 wherein the limiting means comprises:

control signal generator means for developing a control signal from said full bandwidth luminance signal which is related to the absolute value of amplitudes of signal transitions therein; and, soft switch-limiter means connected to the control signal generator means for passing the high pass filtered luminance energy groups in accordance with the control signal so as to limit the amplitude of luminance energy groups within the high pass filtered component to be below a predetermined amplitude level.

22. The apparatus set forth in claim 17 wherein said first combining means comprises:

low pass filter means for filtering the full bandwidth luminance signal into a low pass filtered component;

first subtractor means connected to the input means and to the low pass filter means for subtracting said low pass filtered component from said full bandwidth luminance signal to provide said high pass filtered component;

threshold circuit means connected to said first subtractor means for passing energy groups of said high pass filtered component above a predetermined threshold; and, second subtractor means connected to the input means and to said threshold circuit means for subtracting the resultant threshold processed signal from said full bandwidth luminance signal to provide the composite luminance signal.

23. The apparatus set forth in claim 17 wherein the limiting means comprises:

low pass filter means connected to the input means for low pass filtering the full bandwidth luminance signal to provide a low pass filtered component, first subtractor means connected to the input means and to the low pass filter means for subtracting the low pass filtered component from the full bandwidth luminance signal to provide a high pass filtered component, control signal generator means connected to the input means for generating a multiplier control signal in a range from zero to unity from transition amplitudes present in the the full bandwidth luminance signal, multiplier means connected to the first subtractor means and operating under control of the control signal generator means for multiplying the the low pass filtered component by the multiplier control signal to provide a product, and fourth combiner means connected to said multiplier means and to said low pass filter means for combining said product with said lowpass filtered component to provide said composite luminance signal.

24. The apparatus set forth in claim 23 wherein said control signal generator means comprises:

band pass filter means for band pass filtering the full bandwidth luminance signal in a passband centered about the nominal audio carrier to provide a filtered raw control signal, sign removal means for removing the sign from the raw control signal, and wave shaping means for shaping the raw control signal into said multiplier control signal.

25. The apparatus set forth in claim 23 wherein said control signal generator means comprises:

sign removal means connected to said first subtractor means for removing the sign from said high frequency component to provide a raw control signal, and wave shaping means for shaping the raw control signal into said multiplier control signal.

26. The apparatus set forth in claim 17 further comprising at the receiver:

video separation means for passing a received and separated video signal through two paths: a main path and an enhancement path;

video enhancement means connected to said enhancement path for generating and putting out a transition shortened, enhancement video signal from said separated video;

control signal generator means connected to said main path for deriving a multiplier control signal in a range from zero to unity from transition amplitudes present in the separated video signal;

multiplier means connected to said video enhancement means and operating under control of said control signal generator means for multiplying said enhancement video signal by said multiplier control signal to generate a threshold selected enhancement video signal; and receiver combining means connected to said main path and to said multiplier means for adding the main path separated video signal and the threshold selected enhancement video signal together in proper phase relationship to provide an adaptively enhanced separated video signal at said receiver.

27. The apparatus set forth in claim 26 wherein said video separation means separates and puts out luminance to said two paths.

28. The apparatus set forth in claim 17 further comprising:

audio input means for receiving baseband audio from a source;

sampling means connected to said audio input means and to a source of said synchronizing information for sampling said baseband audio at a rate related to said video synchronizing information to provide an audio sample signal;

frequency stepping oscillator means connected to said sampling means for generating frequency steps in accordance with said audio sample signal wherein each step is an odd multiple of one half of the video synchronizing information rate; and, audio carrier generation means for generating said audio carrier in accordance with said frequency steps so as to be phase coherent with said video synchronizing information.

29. The apparatus set forth in claim 28 wherein said video synchronizing information comprises horizontal line scan synchronizing pulses and said sampling means samples said baseband audio at the horizontal line scan rate.

30. The apparatus set forth in claim 29 wherein the audio input means comprises filter means for separating the baseband audio into two components: a low frequency component of energies lying substantially below a frequency which is one half of the horizontal line scan rate, and a high frequency component of energies lying substantially above a frequency which is one half of the horizontal line scan rate, and further comprising:

double sideband suppressed carrier modulation means connected to the filter means for modulating the high frequency component of energies in quadrature relation with said line scan synchronizing pulses upon an audio subcarrier; and audio combining means for combining the quadrature modulated audio subcarrier and the frequency steps to provide a composite audio modulating signal for generating said audio carrier.

31. The apparatus set forth in claim 28 further comprising at the receiver:

received signal separation means for separating a received video signal having audio energy groups to be separated therefrom into two paths: a main path and a bandpass filtered path having a passband centered about the nominal center frequency of the baseband audio carrier;

receiver first combining means connected to said main path and to said bandpass filtered path for obtaining a received video band rejected path;

comb filter separator means connected to said bandpass filtered path for comb filter separating said audio energy groups out of the received video signal passing through said bandpass filtered path to provide a comb filtered video signal component; and receiver second combining means for combining said received video band rejected path and said comb filtered video signal component in proper phase relationship to provide a full band received video signal in which audio energy groups have been removed by comb filter separation.

32. The apparatus set forth in claim 17 wherein said input means comprises low pass filter means including symmetrically tapped delay line means having an input, an output, and at least one tap between said input and said output at a time delay selected to correspond to the frequency of approximately one half of the attenuation of the filter, amplifier means connected to the input, output and one tap of the delay line means for amplifying signal components obtained at said input, output and one tap, low pass filter combining mean for combining said amplified signal components into a low pass filtered component of said full bandwidth baseband luminance signal.

33. The apparatus set forth in claim 32 wherein said input means further comprises subtractor means for subtracting said low pass filtered component from said full bandwidth baseband luminance signal to obtain said high frequency luminance component.

34. The apparatus set forth in claim 32 wherein said delay line has a length of approximately 320 nanoseconds and has taps connected to said amplifier means at 50 nanoseconds, 160 nanoseconds, and 270 nanoseconds and wherein said amplifier means comprises:

a first amplifier connected to said input for putting out a half amplitude inverse of the input;

a second amplifier connected to the 50 nanosecond tap for putting out a half amplitude of the signal at said 50 nanosecond tap;

a third amplifier connected to the 270 nanosecond tap for putting out a half amplitude of the signal at the 270 nanosecond tap; and a fourth amplifier connected to the output for putting out a half amplitude inverse of the input; and, wherein the low pass filter combining means comprises a first combining circuit for combining the signal at the 160 nanosecond tap with the signals put out by the second and third amplifiers to provide a first output; a second combining means for combining the signal at the 160 nanosecond tap with the signals put out by the first and fourth amplifiers to provide a second output; and a third combining means for combining the first output and the second output to provide a low pass filter output having said low pass filtered component.

* * * * *